Dec. 10, 1957 J. E. BELLINGER, JR., ET AL 2,815,843

AUTOMATIC FORMAT FOR CODE OPERATED WRITING MACHINES

Filed Nov. 2, 1955 2 Sheets-Sheet 1

INVENTORS:
JAMES E. BELLINGER
JOHN H. MACNEILL
BY James S. Shannon AGENT
Wade Koontz ATTY.

AUTOMATIC FORMAT FOR CODE OPERATED WRITING MACHINES

Filed Nov. 2, 1955 2 Sheets-Sheet 2

INVENTORS:
JAMES E. BELLINGER
JOHN H. MACNEILL
BY James S. Shannon AGENT
Wade Koontz ATTY.

United States Patent Office 2,815,843

Patented Dec. 10, 1957

2,815,843

AUTOMATIC FORMAT FOR CODE OPERATED WRITING MACHINES

James E. Bellinger, Jr., Eau Gallie, and John H. MacNeill, Melbourne, Fla.

Application November 2, 1955, Serial No. 544,619

9 Claims. (Cl. 197—20)

(Granted under Title 35, U. S. Code (1952), sec. 266)

The invention described herein may be manufactured and used by or for the United States Government for governmental purposes without payment to us of any royalty thereon.

In the operation of automatic digital computers which read out numbers in binary coded decimal form, the output may be applied directly to a code operated writing machine for the immediate production of a written record or it may be used to perforate tape for later passage through the tape reader of a code operated writing machine. In either case it is necessary that the computer supply in coded form all the necessary instructions relating to the form of the printed material such as tabulate and carriage return instructions, instructions as to the insertion of decimal points and instructions for the truncation of words. Also, if it is desirable to follow the conventional practice of not printing the sign of a number when it is positive and of not printing zeros preceding a significant figure or a decimal point, provision must be made in computer coding to achieve these results.

It is the object of this invention to provide means as part of a code operated writing machine for automatically initiating tabulate and carriage return functions, inserting decimal points, truncating words, preventing the printing of the sign of a word if positive, and preventing the printing of zeros preceding a significant figure or a decimal point. By providing for these functions to be accomplished automatically within the writing machine itself a great deal of memory and storage space in the computer is saved and the preparation of computer problems is simplified.

Briefly the functions of decimal point insert, tabulate and carriage return are accomplished through circuits controlled by a pair of microswitches arranged to be actuated singly or together by clips which may be positioned at desired points along the carriage of the writing machine. The actuation of one switch causes the printing of a decimal point, the actuation of the other switch initiates the tabulate function and the actuation of both switches simultaneously initiates the carriage return function.

All words read out of the computer are preceded by the sign (+ or —) of the word. Printing of the + signs preceding a word is prevented by designing the code translator of the writing machine to initiate one spacing action of the carriage in response to a + code rather than to print the + character. The printing of zeros preceding a significant figure or a decimal point is prevented by a zero convert circuit which is activated upon receipt of sign code (+ or —), indicating the beginning of a word, and operates to convert zero codes to + (space) codes thereby spacing the carriage once for each zero code received. The zero convert circuit is deactivated by the code of any significant figure or as a result of the operation of the decimal microswitch. The truncation of words is accomplished by a code translator disabling circuit which is activated at the time of a tabulate or carriage return operation and deactivated upon the occurrence of a sign code indicating the beginning of a new word.

The automatic format circuits of the machine are designed to operate from tape or by direct read-out from the computer. If the machine is equipped with a conventional tape punch operating to perforate tape with the proper code for each character printed and each function performed by the writing machine, a tape may be prepared simultaneously with the production of the typewritten record that will contain all the necessary format information to permit its use in writing machines not having the automatic format feature.

The invention will be explained in more detail in connection with the specific embodiment thereof shown in the accompanying drawings, in which Figs. 1*a* and 1*b* show the structural details of the decimal and tabulate microswitches;

Figures 1A, 1B:
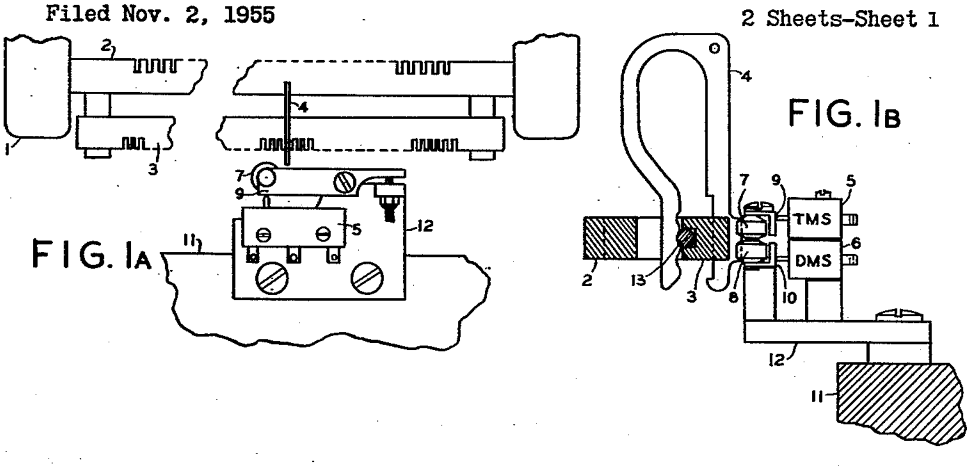

Referring to Figs. 1*a* and 1*b*, 1 indicates the carriage of a code operated writing machine having a conventional tab bar 2 for holding the tab stops and a clip bar 3, added in accordance with the invention, for carrying a number of clips 4 which may be positioned as desired along the bar. The clips 4 operate to actuate tabulate microswitch 5 and decimal microswitch 6 through the agencies of rollers 7 and 8 and actuator arms 9 and 10, respectively. The switches and actuator mechanisms are mounted on the frame 11 of the machine by means of bracket 12. Each clip 4 has 3 vertical positions and may be retained in any one of these positions by means of detent rod 13 which engages one of the three notches provided therefor in the clip. The arrangement is such that the clip in its upper position actuates switch 5 only, in its lower position switch 6 only and in its middle position both switches 5 and 6.

Figure 2:
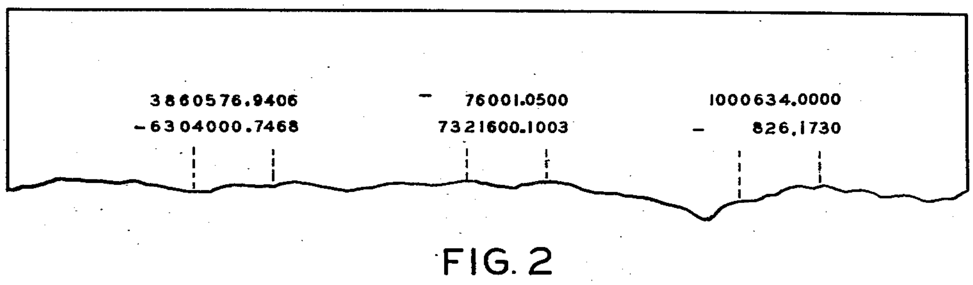
Fig. 2 shows a typical format produced by the automatic format apparatus.

Fig. 2 shows the first two lines of a typewritten record of the output of a computer. The format is typical of that produced by the automatic format apparatus and consists of three columns of words of eleven decimal digits with the decimal points in vertical alignment, with + signs not printed and with zeros preceding significant figures cancelled. The two lines shown represent six consecutive words read out of the computer or derived from a tape record via the tape reader of the writing machine. Each word is preceded by a sign code (+ or —) and the number of code groups, representing decimal places, between the sign code and the point at which the decimal point should occur is the same for all words. In the example shown this number is seven and is provided for in the original preparation of the problem for the computer. As derived from the computer or from tape, the second word had two zero codes between the sign code and the 7 code and the sixth word had four zero codes between the sign code and the 8 code; however, printing of these zeros was prevented by the automatic format apparatus in a manner that will be explained later.

The number of columns and the positions of the decimal points in Fig. 2 is governed by the positioning of clips 4 along the clip bar 3 in Figs. 1*a* and 1*b*. Accordingly, three clips in their lower positions are required to insert decimal points at the proper place in each of the three columns, two clips in their upper positions are required to tabulate from the first to the second and second to third columns, and one clip in its middle position is required to initiate a carriage return function following the last decimal place of the words in the third column.

Figure 3:
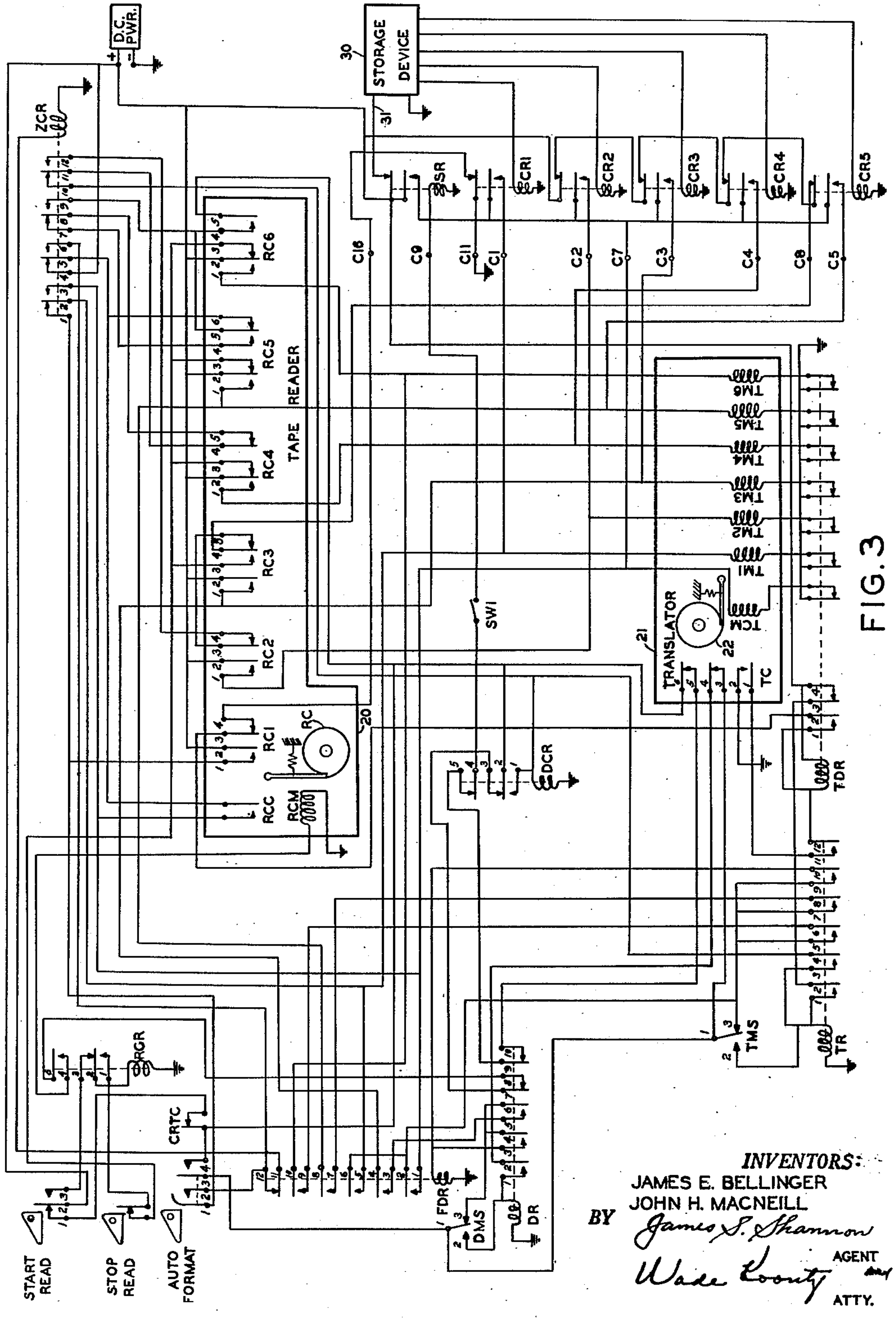
Fig. 3 is a schematic circuit diagram of the automatic format apparatus.

The circuits controlled by microswitches 5 and 6 to effect the decimal insert, tabulate and carriage return functions, as well as the circuits for preventing the printing of zeros preceding a significant figure or decimal point and for truncating words, are shown in Fig. 3.

Referring to Fig. 3, 20 represents the tape reader of a code operated writing machine incorporating the invention. The mechanical construction of the reader follows standard practice in the art and therefore will not be described in detail. Briefly, however, the reader comprises six reader code contacts RC1—RC6, corresponding to the six rows of perforations in the tape used in this example, which are associated with six feeler pins for sensing the presence of code perforations in the tape. Operation of the reader is initiated by energization of reader clutch magnet RCM which actuates clutch RC. The clutch, when actuated, couples the reader to a constant speed power shaft (not shown) causing the reader to operate continuously until RCM is deenergized. When RCM is deenergized the reader stops at the end of its cycle. At the beginning of the reader cycle the feeler pins are allowed to move upward toward the tape. If there is no code perforation above a feeler pin the tape will prevent any further upward movement of the pin and prevent actuation of the associated reader contact. If there is a perforation in the tape above a feeler pin that pin will be allowed to move upward through the hole and this greater upward movement permits its associated reader contact to be actuated. Since the feeler pin and contact actuating mechanism is conventional and well known in the art it is not shown in the drawing for simplicity. Reader common contact RCC does not sense the tape and operates each reader cycle. At the beginning of a reader cycle a tape code group is in position to be sensed by the feeler pins. Therefore the tape is read and the reader contacts actuated early in the cycle. The remainder of the cycle is taken up with retracting the feeler pins and advancing the next code group into reading position.

The code translator 21 of the writing machine is directly associated with the writing machine keyboard and operates in response to coded electrical impulses, derived from the tape reader or directly from the computer, to mechanically select and operate the keylevers of the writing machine. The design of the translator is conventional and well known in the art and therefore its mechanical details are not shown in the drawing. Briefly, however, the device has six permutation bars arranged side by side and slotted along one edge. The permutation bars are held in latched non-operated positions by the armatures of translator magnets TM1—TM6. Energization of any of the magnets unlatches its associated permutation bar and allows it to move a fixed distance longitudinally under spring pressure to an operated position. A plurality of seekers, one for each keylever, are positioned adjacent the slotted edges of the permutation bars and transversely thereof. The slots of the permutation bars are arranged so that in any combination of latched and unlatched positions of the bars the slots under only one of the seekers will be in alignment. After the permutation bars have been positioned in the translator cycle the seekers are allowed to move toward the slotted edges of the bars. The seeker opposite the aligned slots is allowed to move farther than the others and as a result is engaged by a seeker operating bail which pulls the seeker down. The seeker in turn engages a stud on its associated keylever and pulls the keylever down causing the corresponding character to be printed or function to be performed. Prior to the end of the translator cycle the seekers and permutation bars are restored to their normal positions preparatory to receiving the next code.

In the translator of Fig. 3 the permutation bars are so coded that when all bars are in their latched or nonoperated positions the slots are in alignment under the seeker associated with the zero keylever. The coding is also such that a + code causes the seeker associated with the space function to be actuated rather than that associated with the + keylever.

The translator receives its mechanical driving power from a constantly rotating shaft through the agency of a single revolution translator clutch 22 which is controlled by translator clutch magnet TCM. Momentary energization of TCM engages the clutch and initiates one complete cycle of translator operation, after which the translator rests until TCM is again energized. The translator contacts, the purpose of which will be apparent later from the description of the circuit of Fig. 3, are actuated after about 45% of the translator cycle period has elapsed, which is shortly after a seeker drops into the aligned slots of the permutation bars, and return to normal after about 75% of the cycle period has elapsed.

The operation of the various control circuits of Fig. 3 will be described in three situations: (1) conventional operation with conventional tape carrying decimal, tabulate and carriage return codes; (2) automatic format operation from tape; and (3) automatic format operation from direct computer read-out.

*Conventional operation*

Figure 4:
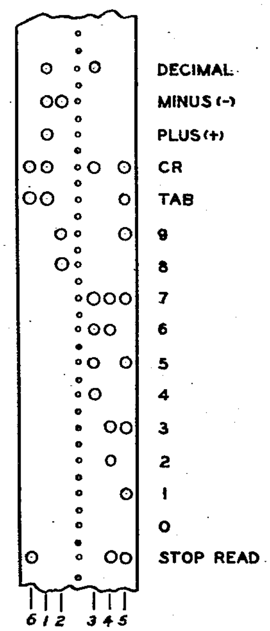
Fig. 4 illustrates the code used with the apparatus of Fig. 3.

In conventional operation the tape must have encoded thereon all the necessary decimal points and tabulate and carriage return instructions to achieve the desired format of the typewritten record. The code with which the circuit of Fig. 3 is designed to operate is shown in Fig. 4.

With the tape in operating position in reader 20, Start Read is momentarily depressed. This applies voltage from (+) D. C. through contacts 2—3 of Start Read and contacts 3—2 of reader control relay RCR to the coil of RCR energizing this relay. RCR holds through a circuit extending from (+) D. C. through contacts 2—3 of RC4, RC5 and RC6 in parallel, Stop Read and contacts 1—2 of RCR to the coil of RCR. Actuation of RCR and release of Start Read causes voltage to be applied from (+) D. C. through contacts 2—1 of Start Read, carriage return tab switch CRTC, contacts 2—3 of delay control relay DCR, contacts 7—8 of decimal relay DR and contacts 5—4 of RCR to reader clutch magnet RCM. Energization of RCM releases reader clutch RC which allows the reader to run at constant speed as long as RCM is energized.

The tape in the reader advances until the first code group of the first word appears in reading position. As already stated, the first code group is always the sign (+ or −) of the word. Assuming, for example, that the first word in the tape is the first word in Fig. 2, the first code group would be + (code 1) and, therefore, RC1 and RCC of the tape reader would be actuated. Actuation of RC1 causes voltage to be applied from (+) D. C. through contacts 2—1 of RC1 and contacts 1—2 of ZCR to TM1. Actuation of RCC causes voltage to be applied from (+) D. C. through contacts 4—5 of ZCR and RCC to translator clutch magnet TCM. As stated in the description of the translator its permutation bars are coded so that + code causes a spacing action instead of printing the + character. Therefore, energization of TCM and TM1 causes the translator to actuate the spacing mechanism of the writing machine.

The next code group is 3 (code 4—5) which causes RCC, RC4 and RC5 to be actuated energizing TCM, TM4 and TM5 and causing the character 3 to be printed. In the same manner the remaining characters of the word, including the decimal point, are printed through the action of the translator in response to the coded electrical output of the tape reader.

The code group in the tape representing the last character of the word is followed by the code group of the tabulate function (code 1—5—6) unless the word is to be the last word in a line in which case it is followed by the code group of the carriage return function (code 1—3—5—6). The operation in the case of the tabulate and carriage return functions differs somewhat from the printing of single characters since more time is required to complete these functions than to complete a single typing operation. This makes it necessary to stop the tape reader until the function is completed. The necessary delay is accomplished as follows: It will be noted that the tabulate code (1—5—6) and the carriage return code (1—3—5—6) both contain codes 5 and 6 but not code 4. When RC5 and RC6 are actuated without RC4 being actuated voltage is applied from (+) D. C. through contacts 2—1 of Start Read, CRTC, contacts 5—4 of RC6, contacts 5—4 of RC5, contacts 7—8 of ZCR, contacts 5—4 of RC4, and contacts 11—10 of ZCR to the coil of delay control relay DCR, energizing this relay. DCR holds from (+) D. C. through 2—1 of Start Read, CRTC and contacts 2—1 of DCR. Energization of DCR breaks the energizing circuit of RCM at its contacts 2—3, causing the reader to stop at the end of the cycle in which the TAB or CR code was read. The actuation of RCC, RC5 and RC6 causes TCM, TM5, and TM6 to be energized and results in a tabulate function being initiated in the writing machine by the code translator. Similarly the actuation of RCC, RC3, RC5 and RC6 energizes TCM, TM3, TM5 and TM6 which results in a carriage return operation. The carriage return tabulate contact CRTC, which is associated with the carriage return and tabulate mechanisms of the writing machine, opens when either of these functions is initiated and closes when the function ends. Therefore at the start of a TAB or CR function CRTC opens and releases DCR. However, RCM is not energized by the release of DCR since its energizing circuit is now broken at CRTC. At the end of the TAB or CR function CRTC closes reenergizing RCM and allowing the reader to resume operation.

The last code group on the tape may be the stop code (4—5—6). The simultaneous actuation of RC4, RC5 and RC6 breaks the holding circuit of RCR allowing this relay to release and deenergize the reader clutch magnet RCM.

*Automatic format operation from tape*

In automatic format operation from tape the tape carries only code groups representing signs and decimal digits since the insertion of decimal points and the initiation of tabulate and carriage return functions are accomplished automatically by the writing machine. As has already been mentioned, the automatic format circuits also operate to prevent the printing of zeros preceding a significant figure or decimal point and to truncate words where necessary.

In this type of operation the Auto Format switch is placed in its actuated position. Momentary depression of Start Read energizes RCR and initiates operation of the reader in the same manner as during conventional operation explained above. The first character group sensed by the reader is the sign code of the first word. If the sign is +, RC1 and RCC are actuated; if —, RC1, RC2 and RCC are actuated. Actuation of RC1 in either case causes voltage to be applied from (+) D. C. through contacts 2—1 of RC1, contacts 1—2 of Auto Format and contacts 12—11 of format delay relay FDR to the coil of zero convert relay ZCR energizing this relay. Actuation of RC1 also causes voltage to be applied from + D. C. through contacts 2—1 of RC1 and contacts 1—2 of ZCR to TM1 energizing this magnet. TM1, due to its rapid action, will normally unlatch its permultation bar before contacts 1—2 of ZCR open. However, if this should not occur for some reason, operation of TM1 after actuation of ZCR is assured by voltage applied thereto from (+) D. C. through contacts 2—1 of RC1 contacts 1—2 of Auto Format, contacts 6—5 of ZCR, RCC and contacts 3—2 of ZCR, which close before contacts 1—2 open, to TM1. Actuation of RCC also applies voltage through the preceding circuit to TCM. Since, as already stated the permutation bars of the translator are so coded that + code causes a spacing action rather than a printing action, energization of TCM and TM1 spaces the writing machine one place. If the sign of the word had been — rather than + however, TM2 would also have been energized by RC2 and would have resulted in a (—) printing action rather than a spacing action.

The purpose of zero convert relay ZCR is to convert received zero codes to + (space) codes. When ZCR is energized it holds through a circuit extending from (+) D. C. through the upper contacts of CR2, CR3, CR4 and CR5 in series, terminal C8, contacts 4—5 of RC3, contacts 3—4 of RC2, contacts 12—11 of ZCR, contacts 4—5 of RC4, contacts 8—9 of ZCR, contacts 5—6 of RC5, contacts 5—6 of ZCR, and contacts 12—11 of FDR to the coil of ZCR. A zero code on the tape is characterized by the absence of perforations and therefore RCC only is actuated when this code is read. With ZCR energized, actuation of RCC causes voltage to be applied from contact 5 of ZCR, which is in the holding circuit of ZCR and therefore has + voltage on it, through RCC to TCM and TM1, the latter being connected in parallel to TCM through contacts 2—3 of ZCR. Energization of TCM and TM1 causes one spacing action of the writing machine. Similarly the writing machine is spaced once for each zero between the sign of the word and the first significant figure. Upon occurrence of a significant figure, one or more of reader contacts RC2—RC5 are actuated breaking the holding circuit of ZCR and releasing this relay. The remaining digits, including 0, are then printed in conventional manner to the end of the word or until the translator is disabled by a tabulate or carriage return function as will be explained later.

Figure 5:
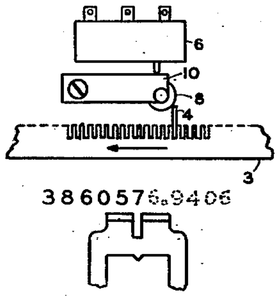
Fig. 5 illustrates the timing of the microswitch operation.

The automatic insertion of a decimal point is initiated by actuation of the decimal microswitch DMS by a clip 4 in its lower position (Fig. 1*b*). The timing of DMS is illustrated in Fig. 5 and is such that the switch is actuated by the spacing movement of the carriage following the printing of the second digit preceding the desired position of the decimal point and is returned to normal by the spacing movement of the carriage following the printing of the first digit preceding the desired location of the decimal point. For example, with reference to Fig. 5, if it is desired that the decimal point occur between the digits 6 and 9 of the number shown, the clip 4 is positioned on clip bar 3 so that DMS is actuated by the spacing movement following the printing of 7 and returned to normal by the spacing movement following the printing of 6.

Referring to Fig. 3 actuation of DMS to the left causes voltage to be applied from (+) D. C. through Start Read 2—1, CRTC, Auto Format 4—3 and contacts 1—2 of DMS to the coil of decimal relay DR energizing this relay which is held by + voltage applied from contacts 1 of DMS through contacts 3—4 of TC and contacts 2—1 of DR to the coil of DR. Actuation of DR opens the energizing circuit of RCM at its contacts 7—8 causing the reader to stop at the end of the cycle in which the digit preceding the decimal point was read.

The carriage spacing action following the printing of the digit preceding the decimal point actuates DMS to the right. This causes + voltage to be applied through contacts 1—3 of DMS and contacts 4—3 of DR to the coil of format delay relay FDR energizing this relay. Actuation of FDR causes + voltage at contact 1 of DMS to be applied through DMS 1—3, DR 6—5 and FDR 3—4 to TM3. Plus voltage at contact 1 of DMS is also applied through TMS 1—3 and FDR 6—5 to TM1, and also through FDR 2—1 to TCM. Energization of TCM, TM1 and TM3 results in a decimal point being printed by the writing machine. When the translator is about half-way through the cycle in which the decimal point is printed, TC is actuated opening the holding circuit of DR at contacts 3—4 of TC and releasing DR which in turn releases FDR. The release of DR reestablishes the energizing circuit of RCM at contacts DR 7—8 so that RCM is reenergized and reader operation is resumed.

The tabulate function is initiated through operation of the tabulate microswitch TMS by a clip 4 that has been placed at a desired position along the clip bar 3 (Fig. 1*a*). The clip 4 in this case is in its uppermost position in order to actuate TMS only (Fig. 1*b*). The timing is the same as for the case of decimal point insertion illustrated in Fig. 5, i. e. the clip 4 is positioned along bar 3 so that TMS is actuated by the carriage spacing movement following the printing of the penultimate digit to be printed.

Referring to Fig. 3, actuation of TMS causes voltage to be applied from (+) D. C. through Start Read 2—1, CRTC, Auto Format 4—3, and TMS 1—2 to the coil of tabulate relay TR energizing this relay, which holds through a circuit extending from (+) D. C. through contacts 4—3 of translator disable relay TDR and contacts 2—1 of TR to the coil of TR. The voltage established across the coil of TR is also applied through contacts 3—4 of this relay to the coil of delay control relay DCR which holds through a circuit extending from (+) D. C. through Start Read 2—1, CRTC and contacts 2—1 of DCR to the coil of DCR. Energization of DCR opens its contacts 2—3 breaking the energizing circuit of RCM and causing the reader to stop at the end of the cycle in which the last digit to be printed was read.

The carriage spacing movement following the printing of the last digit actuates TMS to the right. This causes + voltage at contact 1 of TMS to be applied through contacts 1—3 of TMS and contacts 9—10 of TR to the coil of FDR, energizing this relay. Energization of FDR causes the + voltage at contact 3 of TMS to be applied through FDR 2—1 to TCM, through FDR 6—5 to TM1, through TR 9—8 and FDR 7—8 to TM5, and through TR 5—6 and FDR 9—10 to TM6. Energization of TCM, TM1, TM5 and TM6 initiates the tabulate function in the writing machine. About midway of the translator cycle initiating the tabulate function, TC is actuated and the closing of its contacts 1—2 energizes translator disable relay TDR through a circuit extending from (+) D. C. through the coil of TDR, contacts 12—11 of TR and contacts 1—2 of TC to ground. This relay is held through a circuit extending through its contacts 1—2, contacts 3—4 of RC1, terminal C16 and the upper contacts of CR1 to ground. Actuation of TDR breaks the holding circuit of TR at TDR contacts 3—4, releasing TR which in turn releases FDR, and also opens the energizing circuits of TCM and TM1—TM6, thus disabling the translator. The effect of this in truncating words will be apparent presently.

At the start of the tabulate function CRTC opens releasing DCR but at the same time preventing the reenergization of RCM since it is a series element in the RCM energizing circuit. When the tabulate function is complete, CRTC closes reenergizing RCM and allowing the reader to resume operation. Regarding the word truncating operation, it is possible for the tabulate function to be automatically initiated before the last code group of the word has been read. If this occurs the reader, when it resumes operation at the completion of the tabulate function, proceeds to read the remaining digits of the word. However, the translator does not respond to the reader output for these code groups, since it is disabled by TDR, with the result that the printing of all digits of the word that occur after initiation of the tabulate function is prevented. When the reader senses a + or − sign code, indicating the beginning of a new word, RC1 is actuated and the opening of its contacts 3—4 breaks the holding circuit of TDR. The release of TDR enables the translator to again respond to the reader output. Since TDR releases immediately upon the opening of RC1 contacts 3—4 whereas RC1 remains actuated for an appreciable period of time, operation of the translator is restored in time to respond to the sign code output of the reader.

The carriage return function, the code (1—3—5—6) for which is a combination of the decimal (1—3) and tabulate (1—5—6) codes, is initiated through the simultaneous actuation of the decimal and tabulate microswitches by a clip 4 in its intermediate vertical position (Fig. 1*b*). Again the timing is the same as for the decimal point operation shown in Fig. 5, the clip 4 being positioned along the bar 3 at a point such that the carriage spacing action following the printing of the penultimate digit to be printed in the last word of a line actuates DMS and TMS.

The result of simultaneous actuation of DMS and TMS is the sum of the results of the individual actuation of these microswitches already explained in connection with the decimal point inserting operation and the tabulate function. Briefly reviewed, however, actuation of DMS and TMS to the left in Fig. 3 energizes DR and TR which hold through contacts 3—4 of TC and contacts 3—4 of TDR, respectively. Actuation of TR energizes DCR, which holds through CRTC, and breaks the energizing circuit of RCM at contacts 2—3 causing the reader to stop at the end of the cycle in which the last digit to be printed was read. Actuation of DMS and TMS to the right by the spacing action following the printing of the last digit to be printed energizes FDR. With FDR energized + voltage is applied from contact 3 of DMS through DR 6—5 and FDR 3—4 to TM3, and from contact 3 of TMS through FDR 2—1 to TCM, through FDR 6—5 to TM1, through TR 5—6 and FDR 9—10 to TM6, and through TR 7—8 and FDR 7—8 to TM5. Energization of TCM, TM1, TM3, TM5 and TM6 initiates a carriage return function in the writing machine.

Operation beyond this point is the same as for the tabulate function. The actuation of TC releases DR and energizes TDR which releases TR, TDR holding through contacts 3—4 of RC1. CRTC opens at the start of the carriage return function releasing DCR and at the same time preventing the energization of RCM with which it is in series. At the end of the function CRTC closes and reader operation resumes. The translator, however, is disabled by TDR until this relay is released through the opening of contacts 3—4 of RC1 by a sign code.

*Automatic format operation from direct computer read-out*

This operation differs from the above described operation from tape principally in the manner of applying coded electrical signals to the translator. In the former case the source of these signals was the tape reader; in this case the signals are supplied directly from the computer so that a typewritten record is made concurrently with computer read-out.

The source of the coded information read out by the computer is a memory or storage device forming a part of or associated with the computer. This device is represented by block 30 in Fig. 3. Since the design of the storage device is not a part of this invention its details are not shown, however, in the example given, the device has an input control line 31 and five output code lines connected to code relays CR1—CR5. Since the automatic format feature makes it unnecessary for the computer to supply anything other than sign and digit codes, only five units of the code and therefore only five code lines are necessary. The code is defined on the code lines by the presence or absence of voltage thereon, the presence of voltage being equivalent to a perforation in the tape in the foregoing description of automatic format operation from tape. The operation of the storage device is such that the application of a voltage pulse to control line 31 causes the code group then on the code lines to be replaced by the next succeeding code group.

The application of the codes in the code relays CR1—

CR5 to the translator is controlled by the synchronizing relay SR. The energizing circuit for this relay may be traced from (+) D. C. through contacts 2—1 of Start Read, CRTC, contacts 6—5 of TC, contacts 10—9 of DR, contacts 5—4 of DCR and SW1, closed for this type operation, to the coil of SR. A sychronizing pulse is generated by the opening and closing of contacts 6—5 of TC. As explained before, TC is actuated after about 45% of the translator cycle has been completed and returns to normal after about 80% of the cycle has been completed, at which time the permutation bars have been restored to their latched nonoperated positions. When TC is actuated contacts 6—5 open releasing SR. When SR releases its upper contacts close applying voltage from (+) D. C. to control line 31 which causes the code then in relays CR1—CR5 to be replaced with a new code. When TC returns to normal near the end of the translator cycle contacts 6—5 close energizing SR which applies + voltage through its lower contacts to TCM and also to the lower contacts of code relays CR1—CR5. If any of code relays CR1—CR5 are actuated, voltage is applied to the corresponding translator magnets.

The operation of the zero convert circuit in this case is substantially the same as described above for operation from tape. Assume a sign code, denoting the beginning of a word, in the code relays. If the sign is + CR1 is energized and if − both CR1 and CR2 are energized. In either case when SR is energized by the sync. pulse voltage is applied from (+) D. C. through the lower contacts of SR, the lower contacts of CR1, contacts 2—1 of ZCR, contacts 1—2 of Auto Format, and contacts 12—11 of FDR to the coil of ZCR energizing the zero convert relay. Since contacts 5—6, 8—9 and 11—12 of ZCR are designed to close before contacts 1—2 open, a holding circuit is established before contacts 1—2 open that extends from (+) D. C. through the upper contacts of CR2—CR5 in series, contacts 4—5 of RC3, contacts 3—4 of RC2, contacts 12—11 of ZCR, contacts 4—5 of RC4, contacts 8—9 of ZCR, contacts 5—6 of RC5, contacts 5—6 of ZCR and contacts 11—12 of FDR to the coil of ZCR. In case the sign is +, the resulting voltages at C7 and C1 energize TCM and TM1, causing one spacing action of the writing machine. If the sign is −, voltages occur at C7, C1 and C2 energizing TCM, TM1 and TM2 which results in the − character being printed.

A zero code results in the actuation of SR only. With ZCR energized, actuation of SR causes voltage to be applied (+) D. C. through the lower contacts of SR to TCM and also through contacts 3—2 of ZCR to TM1. The resulting energization of TCM and TM1 causes one spacing action of the writing machine. Upon occurrence of the code of a significant figure, one or more of relays CR2—CR5 are energized opening the holding circuit of ZCR at their upper contacts and ending operation of the zero convert circuit. ZCR is also released by the action of decimal microswitch DMS. When this switch, as seen in Fig. 3, is initially actuated to the left DR is energized and holds through its previously described holding circuit. On the next spacing action DMS is actuated to the right energizing FDR through DR contacts 4—3. Actuation of FDR breaks the holding circuit of ZCR at FDR contacts 11—12.

The operation of the automatic decimal point insert, tabulate and carriage return circuits are the same as already described in connection with automatic format operation from tape. In this case, however, the source of translator code being relays SR and CR1—CR5 rather than the tape reader, the circuits for delaying the application of further code to the translator until the above functions are completed operate to interrupt the synchronizing circuit to SR rather than the energizing circuit of RCM. For the decimal point insert operation the synchronizing circuit is opened at contacts 9—10 of DR. For the tabulate and carriage return functions, the synchronizing circuit is opened at contacts 5—4 of DCR (also at DR 9—10 for carriage return). As before, CRTC opens at the start of the tabulate and carriage return functions and, being a series element in the synchronizing circuit, prevents the operation of SR until it closes at the completion of the function.

The operation of TDR to prevent the printing of any digits of a word remaining after initiation of a tabulate or carriage return function is also the same as described in connection with automatic format operation from tape. In this case, TDR is released by opening of the upper contacts of CR1 rather than contacts 3—4 of RC1.

We claim:

1. A writing machine having a carriage, a pair of trigger means, an actuator for said trigger means, said trigger means being attached to the body of said writing machine, said actuator being attached to and adjustable in position along said carriage, said actuator having three operative conditions in one of which it actuates one only of said trigger means at a predetermined position of said carriage, in the second of which it actuates the other only of said trigger means at said predetermined position and in the third of which it actuates both of said trigger means at said predetermined position, and means responsive to each of the said three manners of actuating said trigger means for initiating three corresponding distinct operations of said writing machine.

2. In a code operated writing machine having a carriage and a code translator operative in response to applied code signals to initiate the character and function operations of the machine, normally inoperative means for applying the code of one of said machine operations to said translator, and means attached to said carriage for actuating said first named means at a predetermined position of said carriage.

3. In a code operated writing machine having a carriage and a code translator operative in response to applied code signals to initiate the character and function operations of the machine, apparatus for initiating a specific character operation of the writing machine at a predetermined position of the carriage, said apparatus comprising: a two-position trigger device and an actuator therefor, one being mounted on said carriage and the other on the body of said machine; said actuator operating said trigger device to a first position during the penultimate spacing action of said carriage preceding said predetermined position and operating said trigger device to a second position during the last spacing action of said carriage preceding said predetermined position; normally inoperative means for halting the application of said code signals to said translator; normally inoperative means for applying the code of said specific character operation to said translator; said trigger device upon operation to its first position initiating operation of said halting means and upon operation to its second position following operation to its first position initiating operation of said specific operation code applying means; and means associated with said translator and operative during the translator cycle initiated by said specific operation code to return said halting and specific character operation code applying means to their normal inoperative states.

4. In a code operated writing machine having a carriage and a code translator operative in response to applied code signals to initiate the character and function operations of the machine, apparatus for initiating a specific function operation of the writing machine at a predetermined position of the carriage, said apparatus comprising: a two-position trigger device and an actuator therefor, one being mounted on said carriage and the other on the frame of said machine; said actuator operating said trigger device to a first position during the penultimate spacing action of said carriage preceding said predetermined position and operating said trigger device to a second position during the last spacing action of said carriage preceding said predetermined position; normally inoperative means for halting the application of said code signals to said translator; normally inoperative means for applying the code of said specific function operation to said translator; said trigger device upon operation to its first position initiating operation of said halting means and upon operation to its second position following operation to its first position initiating operation of said specific function code applying means; means associated with said translator and operative during the translator cycle initiated by said specific function code to return said specific function code applying means to its normal inoperative condition; and means operative at the beginning of said specific function operation to assume the function of said halting means and to return said halting means to its normal inoperative state, and operative at the end of said specific function operation to cause the application of code signals to said translator to be resumed.

5. In a code operated writing machine having a carriage and a code translator operative in response to applied code signals to initiate the character and function operations of the machine, apparatus for initiating a specific function operation of the writing machine at a predetermined position of the carriage, said apparatus comprising: a two-position trigger device and an actuator therefor, one being mounted on said carriage and the other on the frame of said machine; said actuator operating said trigger device to a first position during the penultimate spacing action of said carriage preceding said predetermined position and operating said trigger device to a second position durirng the last spacing action of said carriage preceding said predetermined position; normally inoperative means for halting the application of said code signals to said translator; normally inoperative means for applying the code of said specific function operation to said translator; said trigger device upon operation to its first position initiating operation of said halting means and upon operation to its second position following operation to its first position initiating operation of said specific function code applying means; normally inoperative translator disabling means; means associated with said translator and operative during the translator cycle initiated by said specific function code for actuating said disabling means; means responsive to actuation of said disabling means for returning said specific function code applying means to its normal inoperative state; means operative at the beginning of said specific function operation to assume the function of said halting means and to return said halting means to its normal inoperative state, and operative at the end of said specific function operation to cause the application of code signals to said translator to be resumed; and means responsive to a predetermined code in the signals applied to said translator to return said disabling means to its inoperative state.

6. In a code operated writing machine having a carriage and a code translator operative in response to applied code signals to initiate the character and function operations of the machine, apparatus for initiating at a predetermined position of said carriage any one of three machine operations consisting of a character operation and first and second function operations, in which the code for said second function operation contains all the elements of the codes for said character and first function operations, said apparatus comprising: a two-position character trigger device and a similar two-position function trigger device mounted on the body of said machine and an actuator therefor attached to the carriage of said machine; said actuator having three operative conditions, in the first of which it operates one only of said trigger devices, in the second of which it operates the other only of said trigger devices and in the third of which it operates both trigger devices simultaneously, the operation of each of said devices by said actuator being such that said device is operated to a first position during the penultimate spacing action of said carriage preceding said predetermined position and is operated to a second position during the last spacing action of said carriage preceding said predetermined position; normally inoperative means for halting the application of said code signals to said translator; normally inoperative means for applying the code for said character operation of said translator; one of said trigger devices upon operation to its first position initiating operation of said halting means and upon operation to its second position following operation to its first position initiating operation of said character code applying means; a second normally inoperative means for halting the application of said code signals to said translator; normally inoperative means for applying the code for said first function operation to said translator; the other of said trigger devices upon operation to its first position initiating operation of said second halting means and upon operation to its second position following operation to its first position initiating operation of said first functon code applying means; means associated with said translator and operative at an intermediate point in the translator cycle for returning the first named halting means and said character code applying means to their normal inoperative states; normally inoperative means for disabling said translator; said means associated with said translator also acting in the presence of an actuated first function code applying means to actuate said translator disabling means; means responsive to actuation of said translator disabling means to return said first function code applying means to its normal inoperative state; means operative at the beginning of a function operation to assume the function of said second halting means and to return said second halting means to its normal inoperative state, and operative at the end of said function operation to cause the application of code signals to said translator to be resumed; and means responsive to a predetermined code in the signals applied to said translator to return said disabling means to its inoperative state.

7. In a code operated writing machine for producing a typewritten record from code signals in the form of successively occurring words each composed of a sign code followed by a plurality of decimal digit codes, said writing machine having a code translator to which said code signals are applied and which operates in response thereto to initiate the character operations of said machine, apparatus for preventing the zero character operation for all zero codes occurring between a sign code and the code of a significant digit, said apparatus comprising normally inoperative means associated with said translator for converting an applied zero code into a space code at said translator, means responsive to an applied sign code for activating said converting means, and means responsive to the code of a significant digit to return said converting means to its inoperative condition.

8. Apparatus as claimed in claim 7 in which said translator is designed to initiate a spacing operation in said writing machine in response to an applied positive sign code and in which said converting means converts an applied zero code into a positive sign code.

9. In a code operated writing machine for operation in response to code signals in the form of successively occurring words each composed of a sign code followed by a plurality of decimal digit codes to produce a typewritten decoded record of said words, a code translator responsive to applied code signals to initiate the character and function operations of said machine, said translator being designed to respond to an applied positive sign code to initiate one spacing operation of said machine; means for applying said code signals to said translator; normally inoperative means associated with said translator for converting an applied zero code into a positive sign code at said translator; means responsive to an applied sign code for activating said converting means; means responsive to an applied code representing a significant digit to return said converting means to its inoperative state; a trigger device and an actuator therefor, one being mounted on the carriage of said writing machine and the other on the body of said writing machine, whereby said actuator actuates said trigger device at a predetermined position of said carriage; means responsive to operation of said trigger means for halting the application of said code signals to said translator and for applying a decimal point code thereto; and means associated with said last named means and operating concurrently therewith for returning said converting means to its inoperative state.

References Cited in the file of this patent

UNITED STATES PATENTS

| | | |
|---|---|---|
| 2,439,497 | Tholstrup | Apr. 13, 1948 |
| 2,464,608 | Rabenda | Mar. 15, 1949 |